TELEPHONE BOOTH

Original Filed Sept. 3, 1952 2 Sheets-Sheet 1

*INVENTOR.*
PERCIVAL H. SHERRON
*BY*
Bacon, Smith & Harding
ATTORNEYS

July 28, 1959 P. H. SHERRON 2,896,694

TELEPHONE BOOTH

Original Filed Sept. 3, 1952 2 Sheets-Sheet 2

*INVENTOR.*

PERCIVAL H. SHERRON

*BY*

[signature]

ATTORNEYS 2,896,694

TELEPHONE BOOTH

Percival H. Sherron, Jamaica, N.Y.

Original application September 3, 1952, Serial No. 307,630. Divided and this application April 20, 1956, Serial No. 579,542

3 Claims. (Cl. 155—78)

This invention relates to an improved telephone booth of the so-called stall type. More particularly, it relates to details of construction of the booth and elements used in the assembly thereof.

This invention represents further improvements in the booth structure and is a division of my copending patent application, Serial No. 307,630, filed September 3, 1952.

It is an object of this invention to provide a telephone booth having structural elements which can be fabricated easily and rapidly and which can be assembled to form a rigid structure.

It is a further object of this invention to provide a telephone booth comprising a minimum number of parts and of interlocking construction.

It is a further object of this invention to provide improved seat supporting structure.

The foregoing objects of the invention will become apparent from the following description when read in conjunction with the accompanying drawings, in which.

Figures 6, 7, 8, 9:
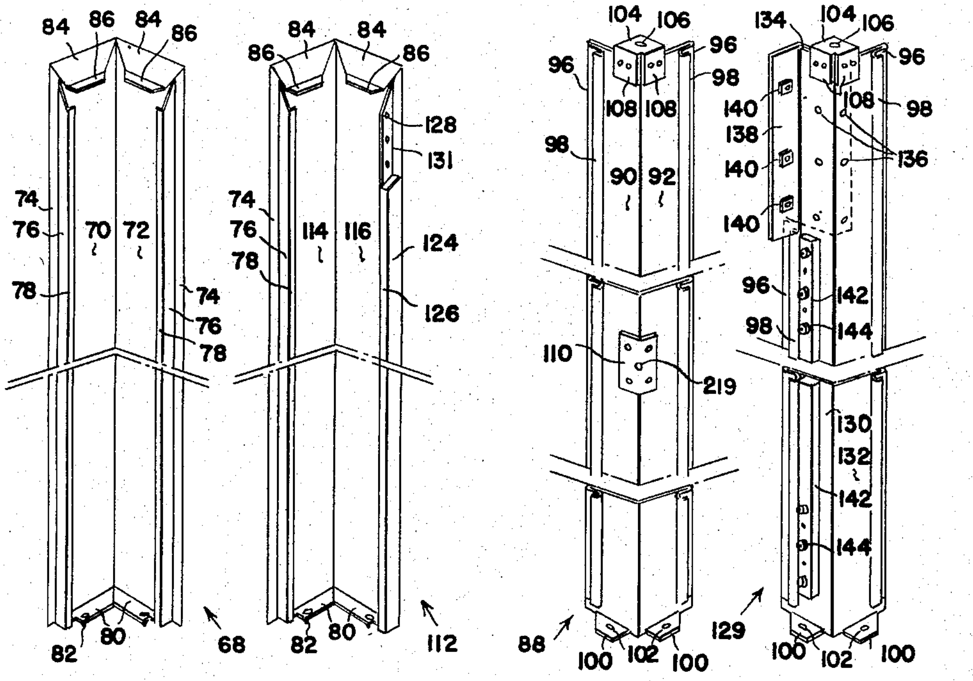
Figure 6 is a perspective view of an outer rear corner post.
Figure 7 is a perspective view of an outer front corner post.
Figure 8 is a perspective view of an inner rear corner post.
Figure 9 is a perspective view of the inner front right-hand corner post.

The telephone booth base includes a lower frame 2 and an upper frame 4. The lower frame includes at its lower edge an inwardly extending flange 6. The upper edge of the lower frame is formed to provide an internal channel 8 opening upwardly. The upper portion 4 of the base is formed with its upper edge providing an inwardly extending flange 10 and having adjacent to its lower edge an internal channel 12 opening downwardly. The channel 8 of the lower base section and the channel 12 of the upper base section face one another and are adapted to retain a strip 14 of a yielding material such as rubber or a soft fibrous material adapted to absorb vibrations transmitted from the surface on which the booth rests and to prevent the passage of these vibrations upwardly into the booth structure.

A strap 16 extends from the front to the rear of the booth and abuts against the inwardly extending rear lower flange 6. A floor plate 18 is attached to the inwardly extending flanges 6 and to the strap 16. Cemented onto the floor plate 18 is a sheet of linoleum or other suitable floor covering 20. A linoleum edging 22 is attached to the front portion of the lower surface of the floor plate 18 and at its ends is attached to inwardly turned flanges 23 of the lower base assembly.

The upper flange 10 of the upper portion of the base is provided, adjacent to each of the four corners of the booth, with bores 24. Straps 26 are secured to the underside of the flanges 10 adjacent to each corner of the booth. The straps are provided with bores 30 in alignment with the bores 24 in the flange 10. The central portions of each of the straps 26 containing the bores 30 are spaced below the flange 10 and the end portions of each of the straps 26 are bent upwardly and are attached to the flange 10 preferably by welding.

In the rear left-hand corner of the booth base, as viewed from the front of the booth, there is provided a seat support structure including a triangularly shaped plate 32 which is adapted to rest upon and be connected to the floor plate 18. The plate 32 is formed with an upwardly extending flange 34 which has tab portions 36 extending from each end thereof and attached to the side wall 2 of the lower portion of the booth base. A bar 38 is attached to the upper surface of the plate 32. A plate 40 is positioned above the plate 32. The upper surface of the plate 40 is attached to the lower surface of the straps 26 in the left rear corner of the booth and is provided with bores 41 in alignment with the bores 30 in the straps 26. The plate 40 is provided with a downwardly extending flange 42 which is provided at its ends with tabs 44 which are adapted to be joined to the side wall of the upper portion 4 of the base. The plate 40 is provided with a bore 46. Attached to the lower surface of the plate 40 is a spring hinge arrangement. One leaf 48 of the hinge is attached to the plate 40 and the other leaf 50, which is adapted to bend downwardly, partially overlaps the bore 46 and has attached to it a metal disc 51 which covers the bore 46 when in an upward position as shown in Figure 3.

Figures 1, 3, 4, 5:
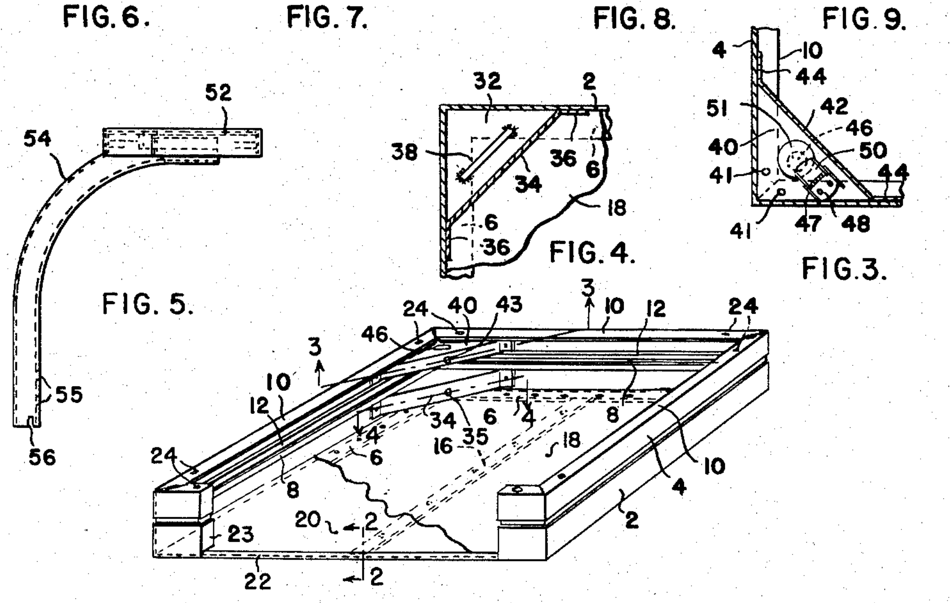
Figure 1 is a perspective view of the booth base.
Figure 3 is a transverse section of a portion of the base taken on the trace 3—3 of Figure 1.
Figure 4 is a transverse section of a portion of the base taken on the trace 4—4 of Figure 1.
Figure 5 is an elevation of the seat and seat support arm employed within the booth.
Figure 2:
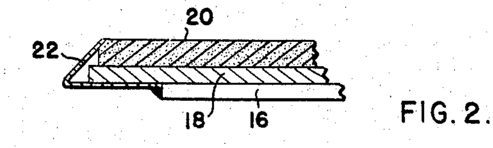
Figure 2 is a vertical section of a portion of the base taken on the trace 2—2 of Figure 1.
Figure 12:
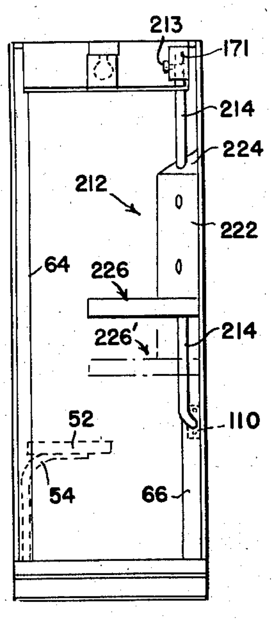
Figure 12 is a diagrammatic showing of the interior of an assembled telephone booth.

In Figure 5 there is shown a seat assembly including a seat member 52 and a curved pipe support 54 the upper end of which is attached to the lower surface of the seat 52. The lower end of the seat support 54 is provided with a notch 56. The lower end of the seat support 54 is adapted to pass through the bore 46 in the plate 40 and the notch 56 is provided to engage the bar 38 attached to the plate 32. When the seat support 54 passes through the bore 46, the leaf 50 of the spring hinge and the disc 51 will be deflected downwardly and out of the way. The flange 42 of plate 40 and the flange 34 of the plate 32 are each provided with at least one bore 43 and 35, respectively. The seat support pipe 54 is provided at its lower end with a pair of bores 55. The bores 55 are tapped and are adapted to receive bolts passed through the bores 43 and 35 for further securing the seat assembly in position.

The booth includes four corner post assemblies 60, 62, 64 and 66. Each of the corner post assemblies comprises an inner corner post and an outer corner post. In Figure 6 there is shown generally at 68 a typical rear outer corner post. This post is formed from a single sheet of metal and includes a pair of vertically extending panels 70 and 72 formed at right angles to each other and forming the outer surfaces of the corner of the booth. The outermost edges of the vertically extending panels 70 and 72 are each provided with a portion 74 bent backwardly upon the inner surface of its associated panel. Extending from and at right angles to each of the portions 74 is a flange 76, and extending from and at right angles to each of the flanges 76 is a flange 78. The flange 78 associated with panel 70 is parallel thereto and extends toward the panel 72 and the flange 78 associated with the panel 72 is parallel thereto and extends toward the panel 70.

At the lower end of each of the panels 70 and 72 there is an inwardly extending flange 80 to which there is secured a downwardly extending pin 82.

At the upper end of each of the panels 70 and 72 there is provided an inwardly and downwardly extending flange 84. The flange 84 terminates in a horizontal inwardly extending flange 86.

The outer post structure described in connection with Figure 6 is typical of the two rear outer post structures. In Figure 7 there is shown generally at 112 the right-hand front outer post. This post includes a pair of vertically extending panels 114 and 116. The panel 114 on the left side of the post, as viewed in Figure 7, has flanges 74, 76 and 78 identical to flanges 74, 76 and 78 on the outer post shown in Figure 6. These flanges, as will be hereinafter described, are adapted to provide, in conjunction with the mating inner post structure, a recess for the reception of a wall panel.

Adjacent to the vertically extending panel 116 is a flange 124 at right angles thereto and extending inwardly therefrom. Extending at right angles to the flange 124 is a flange 126 extending toward the panel 114 and parallel to the panel 116. The upper portion of the flange 124 is formed with a recessed portion 131 which is provided with bores 128 and is adapted to mount a door lintel 133 shown in Figure 13. The upper ends of the panels 114 and 116 are formed with flanges identical to those described as 84 and 86 in the post shown in Figure 6 and the lower ends of the panels 114 and 116 are formed with flanges 80 which contain pins 82 identical to those described in connection with the post shown in Figure 6. The post shown in Figure 7 is an outer front right-hand post and the outer front left-hand post, not shown in detail, is identical to it with the exception of being reversed, that is, if viewed from the interior of the post, the recessed portion 131 would be on the left side of the post as viewed rather than on the right side as shown in Figure 7.

In Figure 8 there is shown generally at 88 the inner right-hand rear corner post. This post is formed from a single sheet of metal and includes a pair of vertically extending panels 90 and 92. The outward edges of each of the panels 90 and 92 are provided with a portion 96 bent backwardly upon its associated panel and terminating in a channel formation 98. The clearance within the channel formation 98 is such as to admit the flange 78 of an outer post, as shown in Figure 6, when the posts are assembled as will be hereinafter described.

Each of the vertically extending panels 90 and 92 is formed at its lower end with inwardly extending flanges 100 and each of the flanges 100 is provided with a bore 102 adapted to receive the pins 82 of the outer post assemblies when the post assemblies are assembled with a floor assembly as will be described.

The inner post, shown in Figure 8, is provided with a ceiling structure support which is a horizontal plate 104 including a central bore 106 and a pair of downwardly extending flanges 108 on planes at right angles to each other and adapted to be joined to the vertically extending panels 90 and 92 by welding, riveting or other suitable means. A pad 110 is attached to the outside surface of the inner right-hand rear corner post in the lower portion thereof and is adapted to support the lower end of the phone mounting post as will be hereinafter described.

In Figure 9 there is shown generally at 129 the front right-hand inner post assembly. This post includes a pair of vertically extending panels 130 and 132 at right angles to each other. The edges of each of the panels are formed with a bent back flange 96 terminating in a channel 98 identical to the formation of the post described in connection with Figure 8. The upper portion of the panel 130 is partially cut away and in place of the bead and channel arrangement 96 and 98 there is provided a Z-section plate 134 which is attached to the panels 130 and 132, as indicated at 136, by rivets, spot welds or other suitable means and provides an outstanding flange 138 to which nut retainers 140 are attached. When the right-hand front inner post, shown in Figure 9, is assembled with the right-hand front outer post, shown in Figure 7, bores through the plate 138 in alignment with the nut retainers 140 on the inner post are adapted to align with the bores 128 in the recess 131 in the outer post. The complete post assembly will be hereinafter described more fully.

To the upper ends of the panels 130 and 132 there is attached a ceiling support plate 104 having downwardly extending flange portions 108 identical to that described in connection with Figure 8, and the lower ends of the panels 130 and 132 are provided with the outstanding flanges 100 which are provided with bores 102 identical with those shown in Figure 8.

Figures 10, 11:
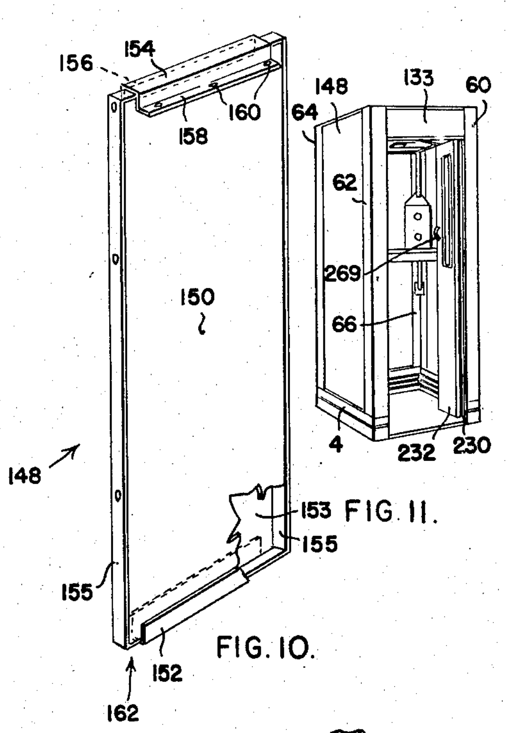
Figure 10 is a perspective view of a wall panel assembly.
Figure 11 is a perspective view of a completely assembled telephone booth.

Also attached to the vertically extending panel 130 is a reinforcing strip 142 which supports nut reainers 144. The reinforcing strip 142 and the vertically extending panel 130 are provided with bores in alignment with the nut retainers 144 for the passage of bolts which attach the hinges mounting the booth doors shown at 232 in Figure 11. The front left-hand inner post assembly is the reverse of that shown in Figure 9 and does not include a door hinge mounting strip 142.

Figures 13, 14:
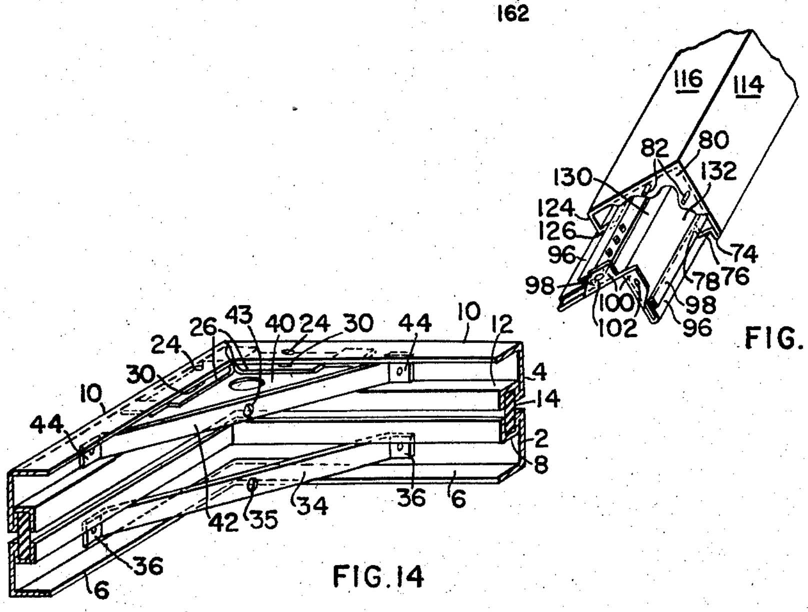
Figure 13 is a perspective view showing the lower end of a partially assembled corner post.
Figure 14 is an enlarged perspective showing of a portion of the floor assembly shown in Figure 1.

Figure 13 shows the outer post of Figure 7 and the inner post of Figure 9 in the process of assembly. It will be noted that the flange 78 is adapted to be retained within the channel 98, and that the flange 96 of the inner post assembly, the flange 74 of the outer post assembly and the flange 76 of the outer post jointly provide a channel shaped recess which is adapted to receive the booth side panel for the right-hand side of the booth which is identical to the side panel 148 shown in Figure 11 in the left side of the both and will be described in detail in connection with Figure 10. The outer post panel 116 is provided with flanges 124 and 126. The flange 126 is adapted to nest within the channel 98 on the inner post and the flange 124 provides a flat surface against which the edge of the booth doors may abut.

The pins 82 affixed to the flanges at the lower end of the outer post are adapted to pass through the bores 102 in the flanges at the lower end of the inner post. The flanges 100 of the inner post are adapted to be passed between the straps 26 of the floor assembly and the upper flange 10 of the floor assembly. The flanges 80 at the lower end of the outer post are adapted to rest upon the flange 10 of the base structure with the pins 82 passing through the bores 24 in the flange 10. When the pins 82 are passed through the bores 24 in the flange 10, the bores 102 in the flange 100 and the bores 30 in the straps 26, they will lock the corner post assembly together and in position with respect to the base structure. This connection between the corners of the base structure and the lower ends of the corner post assemblies is typical for each of the four posts of the booth.

The booth is provided with two side and one rear panel. A typical panel is shown at 148 in Figure 10. The panel is a rectangular member which may be either of sheet metal construction or formed from a single piece of fibrous or other suitable sound absorbent material. The panel assembly shown is formed from a rectangular inner panel 150, a rectangular outer panel 153 and a supporting frame 155 extending around and joining the periphery of the inner and outer panels. Affixed to the lower edge of the panel assembly is a channel 152 having upstanding legs engaging the sides of the panel. The channel 152 is a length shorter than the width of the panel, thereby leaving at the end of the channel 152 a clearance indicated generally at 162 equal to the depth of the channel formed by the flanges 74, 76 and 96 shown in Figure 13.

A channel 154 is attached to the upper edge of the panel assembly. On the outside of the panel assembly the channel is provided with a downwardly extending flange 156. The inside downwardly extending flange of the channel 154 is provided with an inwardly extending horizontal flange 158 which is provided with bores 160. The channel 154 is also shorter than the width of the panel assembly to permit the panel to nest in the post assemblies at its upper end in the manner previously described in connection with its lower end.

It will be evident that various modifications may be made in the embodiment of the invention disclosed herein without departing from the scope of the invention as set forth in the following claims.

What is claimed is:

1. In a telephone booth, the combination comprising a horizontally extending base structure including an upper frame, a lower frame, and a member interposed between said upper frame and a marginal portion of said lower frame, said upper frame, marginal lower frame portion and interposed member conjointly forming upright side walls adapted for extending peripherally about said booth, said upper frame being adapted for mounting the side walls of said booth, and said member being operative to prevent the transmission of sound vibrations between said upper and lower frames, a seat structure, and seat structure support means, said seat structure including a seat and an upright seat support post, said seat structure support means including a pair of horizontally extending plate members vertically spaced one above the other and extending transversely across and close in a corner-forming portion of said upright side walls of the base structure thereby to provide maximum unobstructed floor space in the booth, the upper one of said plate members being affixed to said upper frame and provided with an opening for slidably receiving said seat support post and the lower one of said plate members being affixed to said lower frame and provided with a fixed abutment for the lower terminal of said seat support post for transmitting the load due to the weight of said seat and its occupant directly to said marginal lower frame portion, said seat support post being curved upwardly and inwardly from said plate members to said seat.

2. The combination defined in claim 1 wherein the means providing a fixed abutment for the lower terminal portion of the seat support post is removably interlocked with said lower terminal portion of the seat support post, thereby securing the latter against lateral displacement.

3. In a telephone booth, the combination comprising a horizontally extending base structure including an upper frame, a lower frame, and a member interposed between said upper frame and a marginal portion of said lower frame, said upper frame, marginal lower frame portion and interposed member conjointly forming upright side walls adapted for extending peripherally about said booth, said upper frame being adapted for mounting the side walls of said booth, and said member being operative to prevent the transmission of sound vibrations between said upper and lower frames, a seat structure, and seat structure support means, said seat structure including a seat and an upright seat support post, said seat structure support means including a pair of horizontally extending plate members vertically spaced one above the other close in a corner-forming portion of said upright side walls of the base structure thereby to provide maximum unobstructed floor space in the booth, the upper one of said plate members being affixed to said upper frame and provided with an opening for slidably removably receiving said seat support post and with a spring biased closure for said opening operative to automatically close the same when said seat support post is withdrawn therefrom, and the lower one of said plate members being affixed to said lower frame and provided with means detachably interlocked with said lower terminal portion of the seat support post, thereby securing the latter against lateral displacement and providing a fixed abutment for the same for transmitting the load due to the weight of said seat and its occupant directly to said marginal lower frame portion, said seat support post being curved upwardly and inwardly from said plate members to said seat.

References Cited in the file of this patent

UNITED STATES PATENTS

| | | |
|---|---|---|
| 952,090 | Zdzieblowski | Mar. 15, 1910 |
| 1,439,701 | Haney | Dec. 26, 1922 |
| 1,703,340 | Grennan | Feb. 26, 1929 |
| 2,103,280 | Sherron | Dec. 28, 1937 |
| 2,113,103 | Yost et al. | Apr. 5, 1938 |
| 2,162,804 | Farnum | June 20, 1939 |
| 2,203,320 | Anderson | June 4, 1940 |
| 2,248,810 | Corso | July 8, 1941 |
| 2,295,676 | Meyer | Sept. 15, 1942 |
| 2,305,870 | Haberstump | Dec. 22, 1942 |
| 2,451,674 | Hade | Oct. 19, 1948 |
| 2,465,147 | Butler et al. | Mar. 22, 1949 |

FOREIGN PATENTS

| | | |
|---|---|---|
| 368,152 | France | Sept. 27, 1906 |